Dec. 11, 1928.

E. BRUNNER 1,694,873

LANDING BUMPER FOR AIRSHIPS

Filed Sept. 3, 1926  2 Sheets-Sheet 1

INVENTOR
Eugen Brunner.
BY
ATTORNEY

Dec. 11, 1928.

E. BRUNNER 1,694,873

LANDING BUMPER FOR AIRSHIPS

Filed Sept. 3, 1926  2 Sheets-Sheet 2

INVENTOR
Eugen Brunner.
BY
ATTORNEY

Patented Dec. 11, 1928.

1,694,873

UNITED STATES PATENT OFFICE.

EUGEN BRUNNER, OF AKRON, OHIO, ASSIGNOR TO GOODYEAR-ZEPPELIN CORPORATION, OF AKRON, OHIO, A CORPORATION OF DELAWARE.

LANDING BUMPER FOR AIRSHIPS.

Application filed September 3, 1926. Serial No. 133,398.

My invention relates to devices designed for the purpose of preventing injury to airships during landing operations, and it has particular relation to resilient landing bumpers adapted to be secured to the gondolas or to other lower portions of airship superstructures.

One object of my invention is to provide an elastic airship landing bumper having a wide range of deflection and distortion and which will efficiently absorb shocks incident to the engagement of an airship with the ground.

Another object of my invention is to provide an inflatable landing bumper which is inherently elastic and which includes a cover adapted automatically to cause the bumper to assume a shape substantially following the stream line contour of the portion of the airship to which it is attached.

Various forms of landing bumpers have heretofore been employed in conjunction with rigid and non-rigid airships, but these bumpers were not adapted to withstand forces that cause great distortion and deflection of the bumper walls, and therefore they were not capable of properly absorbing shocks of great magnitude which often occurred when an airship was maneuvered to the ground. In designing the frame work of airships, it is always desirable to provide structural elements, which are as light as possible commensurate with proper strength. Bumpers constructed according to previously known methods, when subjected to severe impacts upon engaging the ground could not efficiently damp the shocks transmitted to the gondolas or cars and from the latter to the frame work of the airship hull. Under such conditions the superstructure of the airship was likely to be damaged.

One form of bumper formerly employed consisted of inflatable bags, the walls of which were composed of rubberized fabric material which possessed practically no elasticity, and for that reason they were incapable of properly absorbing shocks, such as those caused by impact of an airship against the ground during landing operations.

By my invention, the disadvantages which result from the employment of bumpers of the type previously known are obviated. A device embodying my invention consists generally of two major elements composed of highly resilient material, such as rubber. One element is constructed substantially in the form of a relatively large ball adapted to be fastened to the lower portion of an airship; for example, to the gondolas or to the lower vertically disposed fin. The other element consists of a sheet of resilient material, preferably rubber composition, which is connected to the ball at the lower portion thereof; that is, opposite the connection to the lower portion of the airship. The edges of the cover are connected to the airship in surrounding relation with respect to the ball, and the cover is normally under tension. Thus, when the ball is deflated, the cover being under tension, will tend to lie flush with respect to the surface of the portion of the airship to which it is secured. This arrangement reduces wind resistance to a minimum, because the cover conforms substantially to the original shape of the structural portion of the airship supporting it.

After a flight has been made and an airship approaches a landing, the ball is inflated with fluid such as air, thereby bulging the resilient cover outwardly and providing a projecting buffer. The cover also serves as a reinforcing means which yieldingly resists lateral forces exerted against the ball, tending to tilt it.

The size of the rubber ball may be relatively small when it is constructed, and under inflating air pressure, it will increase in size before it is brought into actual service. Thus, the strength of the rubber material is advantageously utilized. In its original or unstretched state, or if the ball is inflated to approximately atmospheric pressure, due to its great elasticity, it is not adapted to properly perform its function as a shock absorber. In the event the ball were inflated under pressure not sufficient to stretch the rubber material, it must be made relatively large, and therefore it must be relatively heavy. These disadvantages are obviated by the invention disclosed herein.

For a better understanding of my invention, reference may now be had to the accompanying drawings, forming a part of this specification, of which;

Figure 1:
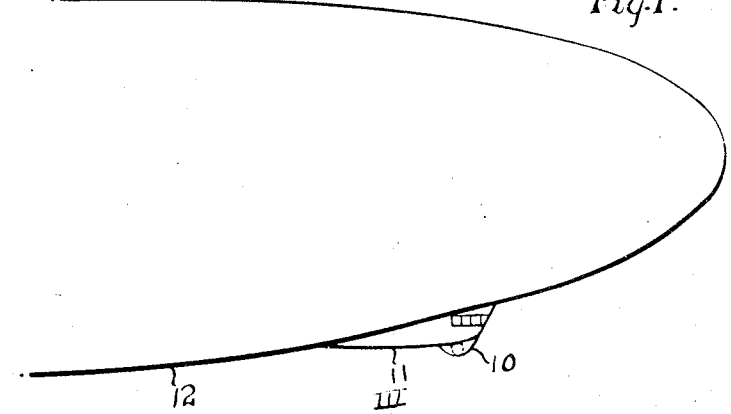
Fig. 1 is a diagrammatical fragmentary elevational view of the front portion of an airship illustrating a landing bumper embodying my invention secured thereto.
Figure 2:
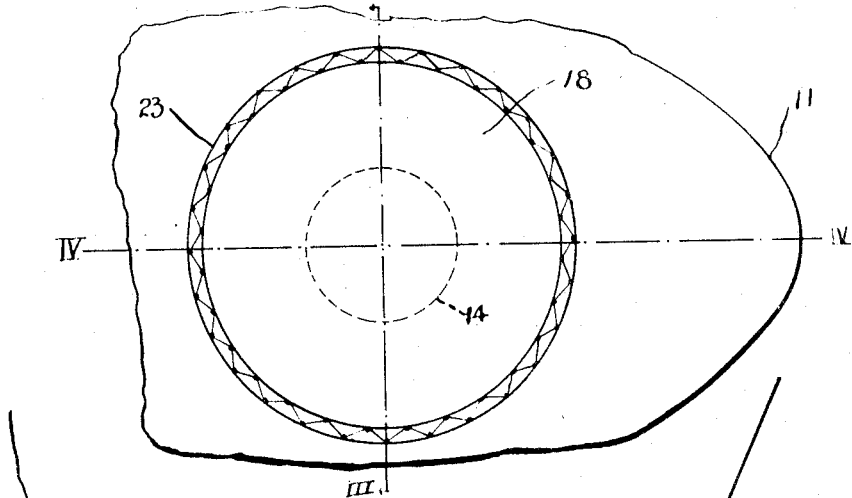
Fig. 2 is a fragmentary plan view, on a larger scale, of an airship gondola and the lower portion of a landing bumper constructed according to my invention secured thereto.
Figure 4:
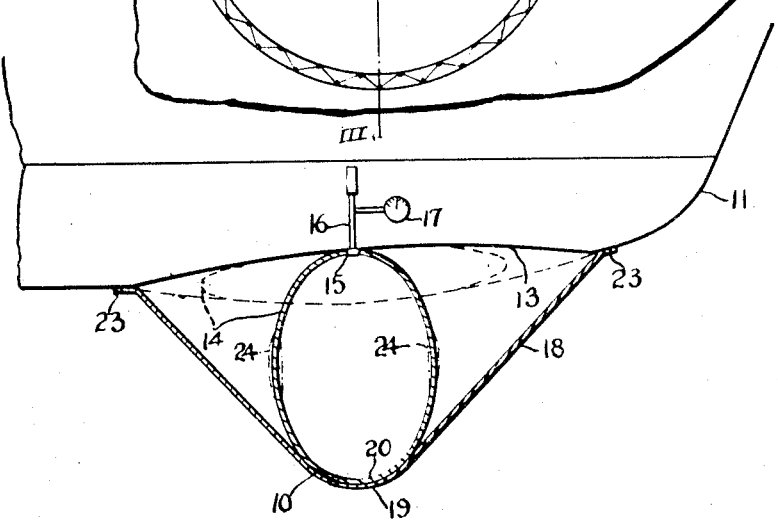
Fig. 4 is a fragmentary cross-sectional view of an airship gondola and a bumper embodying my invention secured thereto, the view being taken substantially along the line IV—IV of Fig. 2.
Figure 5:
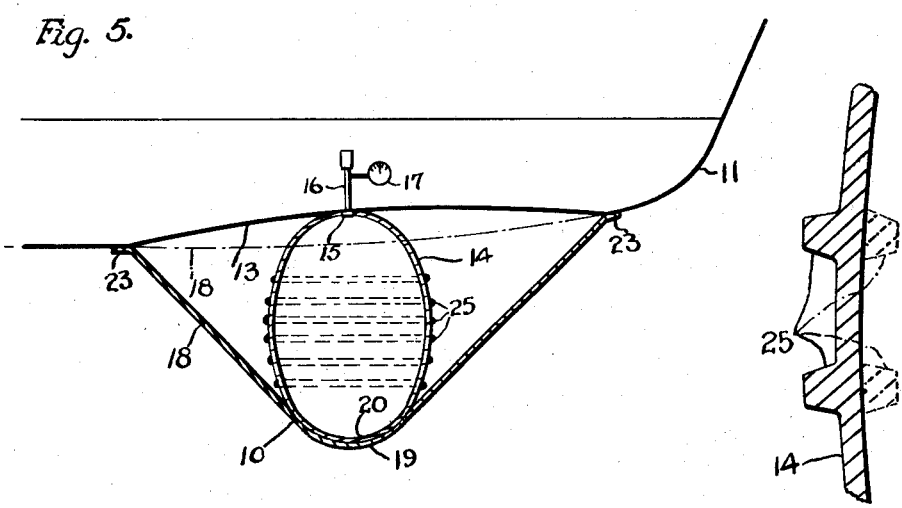
Fig. 5 is a fragmentary cross-sectional view similar to that shown in Fig. 4, illustrating a construction for reinforcing the bumper walls.
Figure 7:
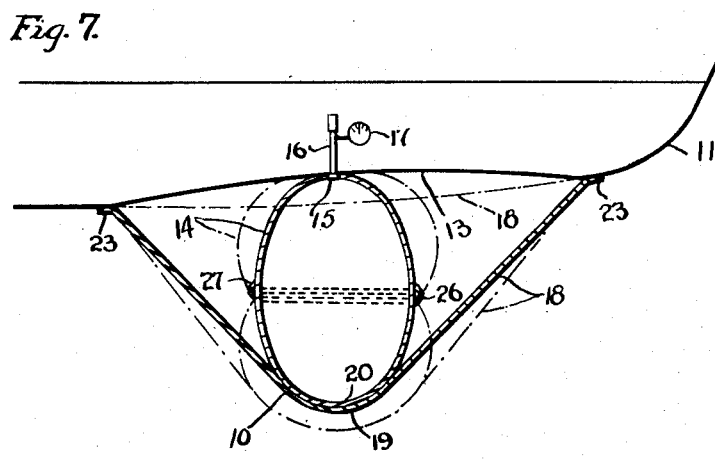
Fig. 7 is a cross-sectional view similar to that shown in Fig. 4, illustrating another form of reinforcing means for the bumper.

In practicing my invention, I provide a bumper generally indicated by the numeral 10 which is shown applied to a gondola or car 11 constituting a lower portion of an airship hull 12. As best shown in Figs. 4, 5 and 7, the lower portion of the gondola 11 is provided with a relatively shallow recess 13 of substantially circular shape diminishing in depth toward its circumferential border.

One major portion of the bumper 10 consists of an inherently elastic inflatable member 14 in the form of a rubber ball which may be spherical, or it may assume the form of an ellipsoid, as illustrated in the drawing. Suitable connecting elements, indicated at 15, are employed for securing the upper portion of the ball to the lower portion of the gondola 11 centrally of the recess 13, and a conduit connection 16 extending into the gondola is adapted to convey inflating fluid, such as air, from a compression tank or other suitable source of supply (not shown). The air pressure within the ball is indicated by a manometer 17 secured to the connection 16.

Figure 3:
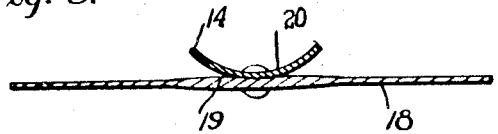
Fig. 3 is a cross-sectional view of a cover constituting a part of the bumper shown in Fig. 2, the view being taken substantially along the line III—III thereof.

The other major portion of the bumper consists of an elastic substantially disc-shaped cover or shield 18, preferably composed of rubber which is secured at its central portion 19 to the lower extremity 20 of the ball, by means of screws, by cementing, vulcanization or by other suitable means. The central portion 19 of the cover is preferably thickened, as best shown in Fig. 3, and gradually diminishes in thickness toward its circumferential edge. It may be desirable to provide a special relief valve that will permit air to escape from the ball under a predetermined pressure, thus insuring utilization of practically the entire height of the bumper for absorbing impact energy of the airship.

The edge portions of the cover 18 are secured, as indicated at 23, to the lower surface of the gondola 11, by means of lacing, screws, bolted rings, or by any other suitable devices. Normally, the circumference of the disc shaped cover 18 is less than the circumference of the line of connection 23. Thus, the covering is radially stretched and remains under tension after it has been secured to the gondola. As best shown in dot-and-dash lines of Fig. 4, the ball 14, when not inflated, is snugly held against the lower surface of the gondola within the recess 13, and the outer surface of the cover assumes a shape conforming substantially to the stream line configuration of the gondola or other part of an airship to which it is secured. From this construction it will be apparent that the bumper when not in use does not materially disturb the stream line configuration of the airship.

When the airship, equipped with a bumper constructed according to my invention, approaches a landing the ball 14 is inflated, thereby stretching the cover outwardly from the gondola 11, the ball assuming an elongate configuration substantially as shown in full lines in Fig. 4. It will be observed that the force of the inflating fluid is resisted by the diametrically opposite ends of the ball engaging the gondola and the cover respectively. Consequently, the central or intermediate portion of the ball between these ends is subjected to increased bulging forces. In order to compensate for these bulging forces, the central portion of the ball between the cover and gondola is reinforced; for example, by increasing the thickness of a central annular portion of the wall, as indicated at 24.

Figure 6:
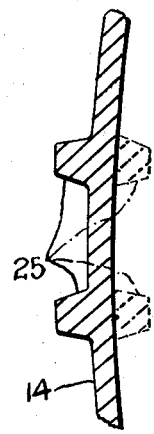
Fig. 6 is a fragmentary cross-sectional view on a larger scale illustrating the wall construction of the bumper shown in Fig. 5.

Another form of wall reinforcing means, illustrated in Figs. 5 and 6, consists of vulcanizing or otherwise securing annular rubber bands 25 circumferentially of the ball, the plane of the annular bands being substantially perpendicular to the longitudinal axis of the ellipsoidal configuration of the ball shown.

Figure 8:
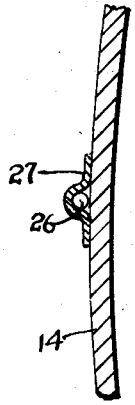
Fig. 8 is a fragmentary cross-sectional view on a larger scale illustrating the wall construction of the bumper shown in Fig. 7.

As best shown in Figs. 7 and 8, another form of circumferential reinforcing means may be provided which consists of an inelastic annular member 26, disposed concentrically of the longitudinal axis of the ball and located substantially midway between the cover 18 and the gondola 11. A strip of fabric or other suitable material 27 is adapted to be cemented or vulcanized over the inelastic member 26 to hold it in proper position. By employing an inelastic reinforcing member at the intermediate portion of the ball, only the upper and lower portions thereof are permitted to expand laterally. Consequently longitudinal expansion of the ball against the force exerted thereon by the cover 18 is more effectively accomplished. Under operating conditions it is desirable to maintain the ball 14 elongated as much as possible commensurate with its proper strength, in order that relatively great deflection, and distortion thereof, may be insured.

From the foregoing description, it will be apparent that a bumper embodying my invention possesses many advantages in construction and operation, and it is peculiarly adapted to serve its purpose in conjunction with airship landing equipment. Moreover, while an airship equipped with a bumper constructed according to this invention is in flight, the ball is deflated and the cover automatically conforms to the normal shape of the airship, thereby obviating unsightly appearance and, at the same time, not materially increasing the wind resistance.

Although I have disclosed but the preferred forms which my invention may assume and have described those forms in detail, it will be apparent to those skilled in the art that the invention is not so limited but that various minor modifications and changes may be made therein without departing from the spirit of my invention or from the scope of the appended claims.

What I claim is:

1. An airship landing bumper comprising an inherently elastic inflatable member and an elastic anchoring shield secured thereto.

2. An airship landing bumper comprising an inflatable member of substanially circular cross-section composed of rubber and a rubber anchoring shield secured thereto.

3. An airship landing bumper comprising an inherently elastic ball provided with walls of substantially uniform thickness and a sheet-like resilient anchoring shield secured thereto.

4. An airship landing bumper comprising a hollow ball composed of rubber and reinforcing annular means disposed about the circumference of the ball.

5. An airship landing bumper comprising a hollow ball composed of rubber and resilient reinforcing rings disposed about the circumference of the ball.

6. An airship landing bumper comprising a hollow ball composed of rubber, annular reinforcing means disposed circumferentially of the ball and an elastic sheet-like cover secured to the ball.

7. An airship landing bumper comprising an inflatable hollow ball composed of rubber and a resilient sheet-like cover of graduated thickness secured thereto.

8. An airship landing bumper comprising an inflatable hollow ball composed of rubber and a sheet-like elastic cover provided with a relatively thick central portion diminishing in thickness toward the edges thereof and means for securing the thicker portion of the cover to the ball.

9. The combination with an airship including a rigid construction at the lower portion thereof provided with a relatively shallow recess, of an inflatable inherently elastic bumper secured centrally of the recess and means for normally maintaining the elastic bumper substantially confined within the recess.

10. The combination with an airship including a rigid construction at the lower portion thereof provided with a relatively shallow recess, of a ball composed of rubber secured within the recess and a member secured to the ball and to the rigid construction tending to maintain the ball confined within the recess.

11. The combination with an airship including a rigid construction at the lower portion thereof provided with a relatively shallow recess, of an inherently elastic ellipsoidal member secured at one end within the recess, elastic means secured to the other end of the ellipsoidal member and means for securing said elastic means to the rigid construction about the recess.

12. The combination with an airship provided with a rigid construction at the lower portion thereof, of an inherently elastic member secured to the rigid construction and an elastic cover secured to the rigid construction and to the elastic member tending to maintain the latter in enclosing relationship against the surface of the rigid construction.

13. The combination with an airship provided with a rigid construction at the lower portion thereof, of an inflatable inherently elastic ball secured to the rigid construction, an elastic sheet-like cover secured to the ball diametrically opposite the portion secured to the rigid construction, said ball being provided with circumferentially extending elastic reinforcing means disposed between the engaging portions of the cover and rigid construction and means for securing the elastic cover to the rigid construction to confine the ball between the cover and the surface of the rigid construction.

14. The combination with an airship provided with a rigid construction at the lower portion thereof, of a landing bumper comprising an inflatable ball composed of rubber, a centrally thickened substantially discshaped elastic cover, means for securing the diametrically opposite portions of the ball respectively to the rigid construction and to the cover, said ball being provided with circumferentially extending elastic reinforcing means disposed between the diametrically disposed connecting points and means for securing the edges of the cover to the rigid construction.

15. The combination with an airship including a rigid construction at the lower portion thereof provided with a recess, of a landing bumper comprising an inflatable ball composed of rubber, a centrally reinforced elastic disc-shaped cover, means for securing diametrically opposite portions of the ball respectively to the rigid construction within the recess and to the central portion of the cover, said ball being provided with circumferentially extending elastic reinforcing means disposed between the diametrically opposite connecting points, means for securing the edges of the cover to the rigid construction, and means for inflating the ball.

In witness whereof, I have hereunto signed my name.

EUGEN BRUNNER.